(No Model.) 2 Sheets—Sheet 1.
F. F. FUNK.
FRUIT GATHERER.
No. 595,160. Patented Dec. 7, 1897.
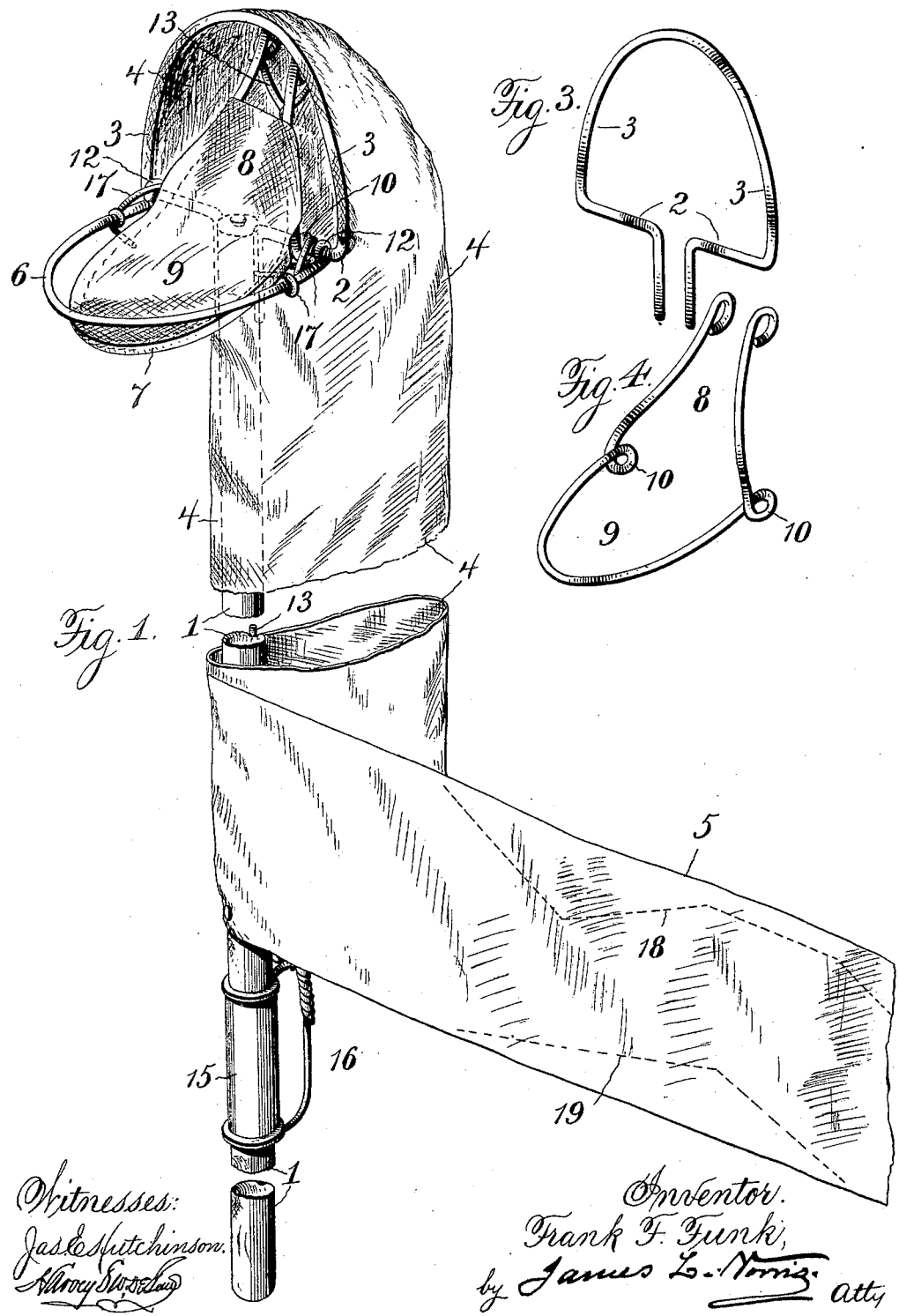

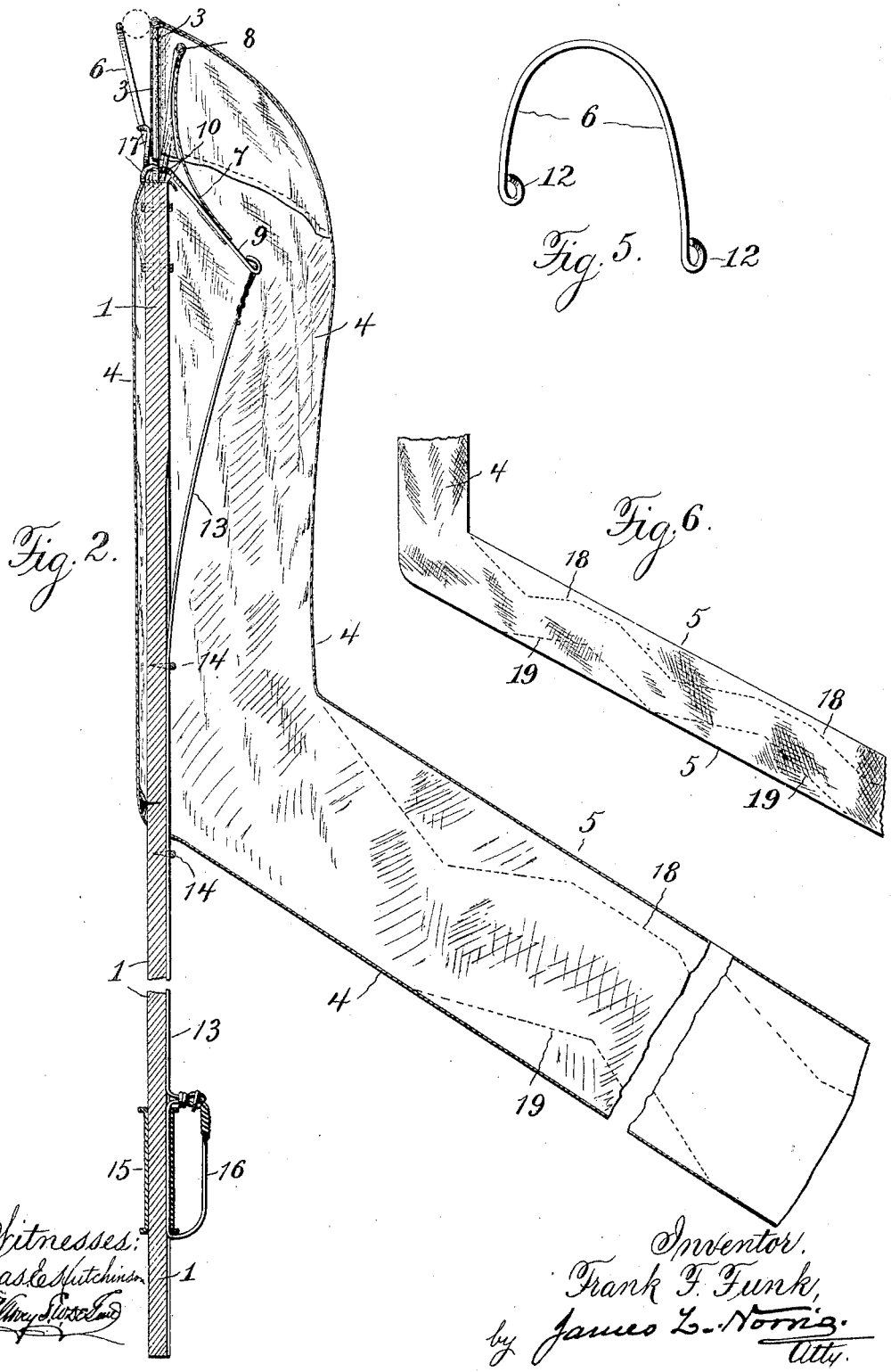

UNITED STATES PATENT OFFICE.

FRANK F. FUNK, OF KINROSS, IOWA.

FRUIT-GATHERER.

SPECIFICATION forming part of Letters Patent No. 595,160, dated December 7, 1897.

Application filed April 2, 1897. Serial No. 630,441. (No model.)

*To all whom it may concern:*

Be it known that I, FRANK F. FUNK, a citizen of the United States, residing at Kinross, in the county of Keokuk and State of Iowa, have invented new and useful Improvements in Fruit-Gatherers, of which the following is a specification.

This invention has for its object to provide a new and improved implement for gathering or picking fruit from the limbs of trees—such as apples, peaches, pears, and the like—whereby the limbs of greater or less size from which the apples, peaches, or pears hang suspended will be gripped and firmly held while the fruit is separated therefrom and forced into a flexible casing which conducts the fruit to the ground or to a basket or receptacle with which the casing may be connected.

The invention also has for its object to improve the construction of the flexible casing whereby the passage of the fruit through the lower portion of the casing is retarded and the apples, pears, or peaches are prevented from being bruised when they fall from the top portion of the casing to the bottom portion thereof.

These objects are accomplished in the manner and by the means hereinafter described and claimed, reference being made to the accompanying drawings, in which—

Figure 1 is a perspective view of sufficient of the improved fruit-gatherer to enable the same to be readily understood, the parts being in proper position to engage an apple, pear, or peach preparatory to detaching the same and forcing it into the casing. Fig. 2 is a sectional view showing the position of the parts when operated to detach the apple, pear, or peach and force the same down into the casing. Fig. 3 is a detail perspective view of the frame to which the mouth of the casing is attached. Fig. 4 is a detail perspective view of the rocking fruit support and detacher. Fig. 5 is a detail perspective view of the yoke-shaped frame for holding the limb of the tree from which the apple, pear, or peach hangs suspended, so that when the instrument is operated the limb is held while the rocking fruit support and detacher separates the fruit from the limb and forces it into the casing; and Fig. 6 is a plan view of the lower portion of the casing, showing the lines on which it is stitched to produce a continuous zigzag passage-way for the descent of the fruit.

In order to enable those skilled in the art to make and use my invention, I will now describe the same in detail, referring to the drawings, wherein—

The numeral 1 indicates the handle of an instrument, which may be composed, as usual, of a pole of sufficient length to enable the operator to reach the fruit hanging on the fruit-trees. The handle or pole may be of any material suitable for the purpose, but is preferably of wood, and to the upper end thereof is secured in any suitable manner the horizontal member 2 of a stationary yoke-shaped or U-shaped frame 3, to which the mouth of the flexible casing 4 is secured in any suitable manner. The handle or pole extends through the upper portion of the flexible casing, but the lower portion of the latter is diverted diagonally or obliquely to form a sleeve-like extension 5, which may be of any suitable length and be adapted to connect with a basket or other receptacle. The horizontal member 2 of the stationary yoke-shaped frame 3 constitutes a bearing or fulcrum for a yoke-shaped limb-holder 6 and a rocking approximately right-angular-shaped fruit support and detacher 7, which comprises two leaf-like members 8 and 9. The rocking fruit support or gatherer comprises a strip of wire bent into approximately right-angular shape and pivots at its angle through the medium of eyes, as at 10, on the horizontal member 2. The right-angular-shaped wire has stitched over it a suitable textile material which fills the spaces existing between the wires and constitutes a support for the apple, pear, or peach which is to be gathered or picked. The leaf-like member 9 is of substantially the same outline as the yoke-shaped limb-holder 6, but is of smaller dimension, so that it can rock back and forth through the limb-holder. This limb-holder is preferably composed of a piece of wire bent into U shape and having eyes 12 at its extremities, which are mounted upon the horizontal member 2 of the stationary yoke-shaped frame 3. The extremity of the leaf-like portion 8 is pivotally connected with the upper end of an actuating rod or wire 13, which extends along the handle or pole and passes through a guide-eye 14, secured to the handle or pole in juxtaposition to a sleeve 15, mounted on the handle or pole and adapted to be moved or slid vertically thereupon. The rod or wire 13 is secured to the sleeve in such manner as to form loop-shaped portion 16 for the passage of the fingers of the hand of the operator which grasps the sleeve 15, but the actuating rod or wire 13 may be connected with the sleeve in any suitable manner, so that when the sleeve is moved the rod or wire will be correspondingly moved.

The parts are represented in Fig. 1 in the position they occupy when the limb-holder and the fruit support and detacher are in their open positions, so that they can be made to engage the fruit. With the parts in the position represented in Fig. 1 the instrument is raised and the apple, pear, peach, or other fruit is made to rest upon the right-angled fruit support and detacher 7, 8, and 9. The sleeve 15 is then moved downward on the handle or pole, which causes the limb-holder and the fruit support or detacher to swing in such direction that the leaf-like member or portion 8 descends in the flexible casing 4, the limb-holder 6 engages the limb from which the fruit is suspended, and the leaf-like member or portion 9 can be caused to move through the yoke-shaped limb-holder 6, so that while the latter holds the limb of a tree the leaf-like member or portion 9 forces the apple, pear, or peach from the limb into the mouth of the flexible casing. The leaf-like members or portions 8 and 9 move to such position in detaching or separating the peach, apple, or pear from the limb held by the limb-holder 6 that the member or portion 8 will stand pendent in the flexible casing and permit the passage of the fruit through the casing to the lower portion thereof, whence it is deflected laterally into the diagonal or oblique flexible sleeve 5 to be conducted to the ground or to a basket or other receptacle with which the sleeve 5 may be connected. The rocking fruit support or gatherer 7, 8, and 9 is yieldingly connected with the yoke-shaped limb-holder 6 in such manner that the fruit support and detacher and the limb-holder move together when the sleeve 15 is operated, while at the same time when the limb-holder 6 presses against and holds the limb of the tree the leaf-like member or portion 9 of the fruit support and detacher can continue its motion and move bodily through the yoke-shaped limb-holder 6 for the purpose of positively detaching the apple, pear, or peach from the limb which is held between the limb-holder 6 and the stationary yoke-shaped frame 3, to which the mouth of the flexible casing is secured. The yielding connection between the fruit support and detacher and the limb-holder may be of any suitable construction, but preferably it is in the form of two springs 17, arranged upon the horizontal member 2 in juxtaposition to the points where the fruit support and detacher and limb-holder are journaled or pivoted thereupon. The springs 17 are preferably coiled elastic wires and each one has its two extremities engaged, respectively, with the limb-holder and the rocking fruit support and detacher, as will be obvious without further explanation.

In the practical use of the improved fruit-gatherer when the sleeve 15 is lowered on the handle or pole the limb-holder 6 is first caused to grip and hold the limb against the stationary yoke-shaped frame 3, after which the motion of the limb-holder ceases, but the rocking fruit support and gatherer continues its motion and the leaf-like member or portion 9 moves bodily through the yoke-shaped limb-holder 6, thereby detaching or separating the fruit with certainty and forcing it down into the flexible casing.

The material composing the diagonal or oblique sleeve portion of the flexible casing is stitched together on zigzag lines, as at 18 and 19, Fig. 6, for the purpose of forming a continuous zigzag passage-way which retards the motion of the apples, pears, or peaches as they descend through the sleeve and thus greatly reduces the liability of the fruit being bruised by forcible contact due to the velocity attained in moving downward through the perpendicular portion of the flexible casing. The stitching of the sleeve 5 on the zigzag lines 18 and 19 secures a continuous closed zigzag passage, which secures the desired result in a much better manner than where the flexible casing is provided with attached alternating baffle-shields on its interior, as in the latter construction the fruit must fall from one shield to the other, and the forcible contact with the independent shields results in serious damage to the fruit by the time it reaches the ground or the basket or receptacle into which it is delivered. In my construction it is possible to accumulate from ten to twelve apples, pears, or peaches in the sleeve-like portion and then to subsequently dislodge all of them by shaking the sleeve and the fruit will not be seriously bruised or damaged, particularly as they glide smoothly through the zigzag passage in contradistinction to falling swiftly through space or falling from one baffle-shield to another.

My invention provides a very desirable fruit gatherer or picker, which can be economically manufactured and is susceptible of being conveniently and rapidly operated. The attendant or operator can use both hands in holding, supporting, and manipulating the handle or pole and pay no attention to the fruit which passes through the flexible casing, except, perhaps, from time to time to shake out the fruit which may accumulate in the zigzag passage-way of the sleeve 5. It is preferable to grasp the sleeve 15 with the left hand and with the right hand grasp the handle or pole at a point above the sleeve, by which means the handle or pole, although it may be of considerable length, can be easily manipulated and moved about in the tree for selecting and picking the fruit desired.

Having thus described my invention, what I claim is—

1. The combination with a handle, or pole, a yoke-shaped frame secured to the upper end thereof, and a flexible casing having its mouth secured to said yoke-shaped frame, of a rocking limb-holder, a rocking fruit support and detacher movable through the limb-holder for detaching the fruit while the limb-holder holds the limb, and means for operating the limb-holder and the fruit support and detacher, substantially as and for the purposes described.

2. The combination in a fruit-gatherer, of a handle, or pole, a frame secured to one end thereof, a flexible casing attached to said frame, a rocking limb-holder and a rocking fruit support or detacher, both journaled upon a part of said frame, a part of the fruit support and detacher being movable through the limb-holder after the latter has been engaged with the limb, a yielding connection between the limb-holder and the fruit support and detacher, and means for rocking the limb-holder and the fruit support and detacher, substantially as and for the purposes described.

3. The combination in a fruit-gatherer, of a handle, or pole, a yoke-shaped frame secured to one end of the handle, or pole, a flexible casing attached to said yoke-shaped frame, a rocking yoke-shaped limb-holder journaled upon said frame, a rocking right-angular-shaped fruit support and detacher also journaled upon said frame, a yielding connection between the limb-holder and said fruit support and detacher, a rod or wire connected with one extremity of the rocking fruit support and detacher, and means for operating said rod or wire to rock the limb-holder and the fruit support or detacher, substantially as and for the purposes described.

4. The combination in a fruit-gatherer, of a handle, or pole, a yoke-shaped frame secured to one end thereof, a flexible casing attached to the yoke-shaped frame, a rocking yoke-shaped limb-holder journaled upon said frame, a right-angular-shaped fruit support and detacher also journaled upon said frame, a spring having two extremities connected, respectively, with the limb-holder and the fruit support and detacher, a rod or wire connected with a part of the fruit support and detacher, and means for operating said rod or wire to rock the limb-holder and the fruit support and detacher, substantially as and for the purposes described.

5. The combination with the flexible casing, of a fruit-gatherer having a handle, or pole, of a diagonal or oblique sleeve-like extension provided on the lower end of said casing and having zigzag lines of stitching or fastenings to provide a continuous zigzag passage-way through said sleeve-like extension for retarding passage of the fruit therethrough, substantially as and for the purposes described.

In testimony whereof I have hereunto set my hand in presence of two subscribing witnesses.

FRANK F. FUNK.

Witnesses:
ANDREW MOLER,
J. E. SEITSINGER.